United States Patent [19]

Moore

[11] 4,229,191
[45] Oct. 21, 1980

[54] TECHNIQUE FOR MODIFYING THE CAPACITY OF GAS-LIQUID SEPARATOR

[76] Inventor: Lester P. Moore, 233 Hereford, Corpus Christi, Tex. 78408

[21] Appl. No.: 931,275

[22] Filed: Aug. 4, 1978

[51] Int. Cl.² .............................................. B01D 53/24
[52] U.S. Cl. ....................................... 55/203; 55/418; 55/457
[58] Field of Search ...................... 55/52, 92, 201–204, 55/207, 238, 399, 418, 456, 457

[56] References Cited

U.S. PATENT DOCUMENTS

| 680,717 | 8/1901 | Labadie | 55/457 X |
| 3,538,684 | 11/1970 | Esterhoy, Jr. et al. | 55/457 X |
| 3,597,901 | 8/1971 | Heeney | 55/457 X |

FOREIGN PATENT DOCUMENTS 793989  4/1958  United Kingdom ...................... 55/457

*Primary Examiner*—Robert H. Spitzer
*Attorney, Agent, or Firm*—G. Turner Moller

[57] ABSTRACT

There is disclosed a gas-liquid separator of the type imparting a swirl to the incoming gas-liquid mixture in order to centrifugally throw liquid droplets out of a main gas flow path. The swirling mechanism comprises a helical screw. The capacity of the separator is selectively reduced by blocking off one or more of the separate and distinct flow paths provided between the flights of the helical screw.

7 Claims, 5 Drawing Figures

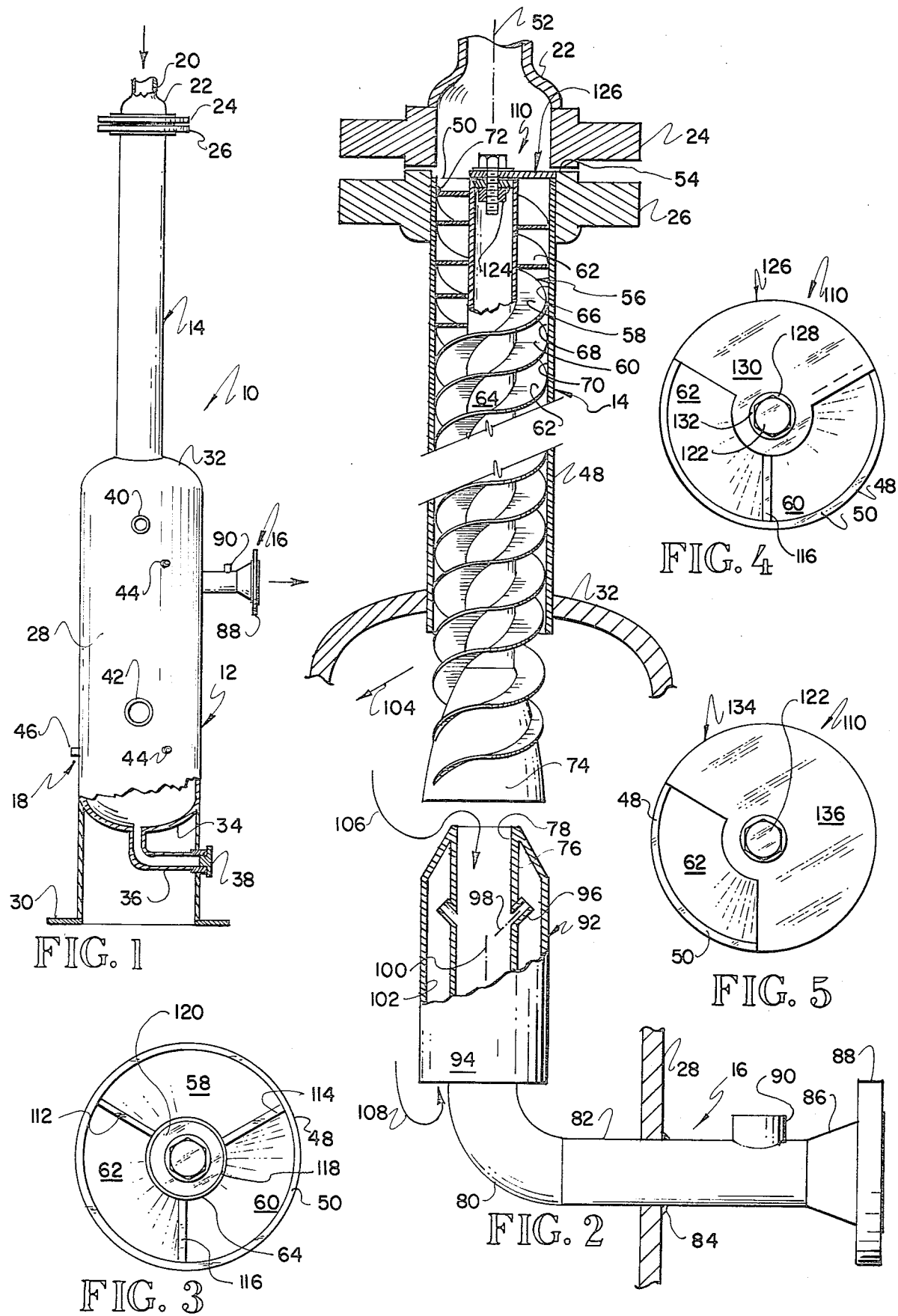

TECHNIQUE FOR MODIFYING THE CAPACITY OF GAS-LIQUID SEPARATOR

This invention relates to an improved gas-liquid separator of the type employing a mechanism for swirling an incoming gas-liquid mixture in order to centrifugally throw liquid droplets out of a main gas flow stream.

Gas-liquid separators of the type operating on centrifugal principles are old and well known in the art. These devices typically comprise a helical screw disposed in the annulus between concentric conduits. The flow path for the gas-liquid mixture is of helical shape and is defined by the flights of the adjacent helical elements and by the concentric conduits.

One of the big advantages of centrifugal gas-liquid separators of this type is that they exhibit very large throughput capacities relative to their size or weight. The reason, of course, is that separating efficiency depends on a high velocity through the screw rather than a low velocity as is the case in typical conventional large vessel separators. Indeed, the only theoretical limit of separator capacity is dictated by the critical velocity of the mixture passing through the helix. As a practical matter, the limit on separator capacity is the pressure drop across the device which necessarily increases as the throughput volume increases. It will be evident that a substantial pressure drop across a separator may reduce the pressure in the gas stream to a value insufficient to enter a pipeline or otherwise create operational difficulties. Because of their wide operating capacity range and high capacity per unit volume or weight, gas-liquid separators operating on centrifugal principles have enjoyed considerable acceptance in the oil and gas industry.

In many applications in the oil field, such as in pipelines or in connection with plants, refineries and the like, the gas volume delivered through a separator may fluctuate widely but is always above a predetermined minimum volume which is necessary to create the high flow velocity which insures high separating efficiency. This is not necessarily the case in separators used in conjunction with wells producing associated or nonassociated gas. Taking a gas well as exemplary, the capacity of the well to produce is almost universally at its peak when the well is first completed. It is, of course, at this time that production equipment such as gas-liquid separators are purchased and installed. The producing capacity and the actual production from a typical gas well normally declines rather slowly until the well begins to make appreciable amounts of salt water. The onset of salt water production normally substantially reduces the gas producing capacity and actual production of a gas well. Accordingly, it often occurs that gas-liquid separators acting on centrifugal principles are substantially oversized when a well begins to make salt water to an extent that separation efficiency drops off significantly. Because the well is now making significant amounts of salt water, separation efficiency is just as important as during the high flow rate conditions which existed earlier in the life of the well. Accordingly, it is not unusual to replace a centrifugally acting gas-liquid separator with a conventional tank type separator shortly after the onset of salt water production in order to achieve satisfactory separation efficiency.

There are, of course, other common situations when it is desirable to reduce the design capacity of a centrifugally acting gas-liquid separator. One common situation is when a well is plugged so that the production equipment associated therewith is available for use with another well. Often, the separator that is available has too much capacity for the well that the operator desires to use it with. Another example involves the rental of separation equipment where one must have a number of different sized units in order to meet the requirements of the operator desiring to rent or lease a separator.

Another problem or disadvantage of centrifugally acting gas-liquid separators is the reverse of its primary advantage. Because the helix elements used in the device are commercially available in only a finite number of sizes and none are available in very small sizes, it is presently uneconomic to construct centrifugally acting gas-liquid separators in very small sizes.

The gas-liquid separator of this invention overcomes the low volume capacity difficulties of presently available centrifugally acting separators by providing means for selectively blocking off or rendering ineffective one or more but less than all of the separate and distinct flow paths defined between the flights of the screw. By making these blocking elements selectively removable and installable, one can reduce or enlarge the minimum operating capacity of the separator in a simple, quick and inexpensive fashion.

One disclosure of interest relative to an ancillary feature of this invention is U.S. Pat. No. 3,538,684.

In summary, the separator of this invention comprises a conduit having therein a multiflight helix in which a gas-liquid mixture is transported. Because of the swirl induced in the mixture, liquids are thrown toward the interior wall of the conduit which opens into a collection vessel. As the gas-liquid mixture passes into the collection vessel, the liquid component is thrown radially toward the walls thereof and gravitates down the walls to collect in the bottom of the vessel. Gas entering the collection vessel exits through a separate outlet.

In order to reduce the operating capacity of the separator, the inlet flange is provided with means to accept and retain a blocking element which effectively blocks off or seals one or more but less than all of the flow paths defined between the flights of the multibladed helix.

Taking a three bladed helix as exemplary, one may reduce its minimum operating capacity by one-third by installing a blocking element to seal off one of the three flow paths provided between the flights of the screw. By blocking off two of the three flow paths, one can reduce the minimum capacity of the separator by two-thirds.

It will accordingly be seen that a gas-liquid separator of this invention of any predetermined size provides a substantially increased operating range and, more specifically, can be manipulated to accomodate low flow rate situations.

It is an object of this invention to provide a gas-liquid separator including means for reducing the minimum design capacity or throughput while maintaining high separation efficiency.

Other objects and a fuller understanding of the invention may be had by reference to the following description taken in conjunction with the accompanying drawing and claims.

IN THE DRAWING

FIG. 1 is a side elevational view of a gas-liquid separator of this invention, certain parts being broken away for clarity of illustration;

FIG. 2 is an enlarged vertical cross-sectional view of part of the separator of FIG. 1;

FIG. 3 is a top elevational view looking into the inlet end of the separator inlet structure illustrating all of the fluid flow paths in an open and operative condition;

FIG. 4 is a view similar to FIG. 3 illustrating a blocking element across one of the flow paths thereby reducing the minimum operating capacity of the separator by one-third; and FIG. 5 is a view similar to FIGS. 3 and 4 illustrating a blocking element extending across two of the flow paths thereby reducing the capacity by two-thirds.

Referring to FIG. 1, there is illustrated a gas-liquid separator 10 comprising a collection vessel 12, an inlet structure 14, a gas outlet 16, and a liquid outlet 18. The inlet structure 14 is connected to a gas flow line 20 by a swedge 22 and a pair of flanges 24, 26 which are bolted together in a conventional fashion.

Although the gas-liquid separator 10 may be of the horizontal type, it is illustrated as vertical in which the collection vessel 12 comprises an upstanding cylinder 28 having a base 30, an upper end cap 32 through which the inlet structure 14 extends, and a lower end cap 34. Opening through the lower end cap 34 is a conduit 36 which is normally closed by a bull plug 38 and which provides a drain for the vessel 12. A number of miscellaneous fittings extend through the cylinder 28 such as a pressure gauge fitting 40, a level control fitting 42, a pair of sight glass fittings 44, and a pipe nipple or stub conduit 46 comprising the liquid outlet 18.

Referring to FIG. 2, the inlet structure 14 comprises an inlet conduit 48 opening into the vessel 12 having the flange 26 welded to the upper end thereof. For purposes more fully explained hereinafter, the conduit 48 terminates in a circular shoulder 50 perpendicular to a longitudinal axis 52 of the conduit 48 at a location below the upper sealing face 54 of the flange 26.

Inside the conduit 48 is a mechanism 56 for accelerating and swirling the incoming gas-liquid mixture for effecting centrifugal separation of the liquid component from the gas component. For purposes of this invention, the inlet structure 14 should provide a plurality of separate and distinct flow paths for the incoming mixture. To this end, the mechanism 56 comprises a multiflight or multiblade corkscrew which is here defined as being either helical or spiral. Most desirably, the mechanism is of helical configuration. For purposes of illustration, the mechanism 56 comprises three blades or flights 58, 60, 62 wound about and welded to a central tubular support 64. Thus, in the illustrated embodiment, there are provided three distinct helical flow paths 66, 68, 70 which are respectively located between the flights 62, 58, the flights 58, 60 and the flights 60, 62.

The mechanism 56 is supported inside the conduit 48 in any suitable fashion, as by placing weldments 72 along the edges of the blades 58, 60, 62 where they can be reached from the opposite ends of the conduit 48. Although there is not a perfect seal between the outer edges of the blades 58, 60, 62 and the interior wall of the conduit 48, the fit is fairly close and prevents substantial communication between the flow paths 64, 66, 68. In addition, it has been learned that any leakage between the exterior of the blades 58, 60, 62 and the interior wall of the conduit 48 does not deleteriously affect separation efficiency for at least one reason. The bulk of the material leaked is liquid because it is on the outside of the corkscrew mechanism 56. It is apparent that once a liquid contacts a metal surface inside the separator 10, the liquid does not thereafter escape through the gas outlet 16.

A bell or enlargement 74 is welded to the bottom end of the tubular support 64 and the blades 58, 60, 62 are helically wrapped around and secured to the enlargement. For this reason, the enlargement is desirably generally symmetrical about the axis 52.

The gas outlet 16 comprises a vertical conduit section 76 disposed immediately below and coaxial with the enlargement 74. The conduit section 76 is desirably considerably smaller than the bottom of the enlargement 74 to prevent liquid slugs passing through the inlet structure 14, as when a well is first turned on, from entering the open upper end 78 of the conduit section 76. The conduit section 76 includes a curved bottom end 80 secured, as by welding or the like, to a straight conduit section 82 passing through the wall of the cylinder 28 and secured thereto by a weldment 84. An enlarger 86 and flange 88 are secured to the end of the conduit section 82 for connection to a similar flange (not shown) provided by a gas flow line. A fitting 90 opens into the conduit section 82 exterior of the cylinder 28 for receiving a relief valve (not shown).

A gas recovery sleeve 92 is fitted onto the vertical portion of the conduit section 76 and comprises an open bottom conduit 94 welded to the exterior of the upper end of the conduit section 76. A plurality of stub conduits 96 open into the interior of the conduit section 76 and provide an axis 98 describing an acute angle with the flow path axis 100. Accordingly, a minor portion of the gas exiting from the inlet structure 18 which does not enter the open upper end 78 of the gas outlet 16 passes upwardly into the annulus 102 and is drawn through the stub conduit sections 96 into the conduit section 76.

In operation, the incoming gas-liquid mixture passes into the inlet structure 14 and moves through the flow paths 66, 68, 70 in a generally helical trace. The liquid component, which is necessarily substantially heavier than the gas component, is centrifugally thrown toward the exterior of the blades 58, 60, 62 such that the liquid component exiting from the conduit 48 inside the vessel is directed generally radially along a path 104 toward the interior wall of the cylinder 28. The liquid component accordingly collects in the bottom of the vessel 12. When the liquid level rises sufficiently to energize the level control mechanism (not shown) extending through the fitting 42, the level control mechanism energizes a control valve (not shown) connected to the nipple 46 for dumping liquid from the vessel 12.

A major portion of the gas component exiting from the inlet structure 14 moves along a path 106 into the open upper end 78 of the conduit section 76 for delivery through the gas outlet 16. A minor portion of the gas component bypasses the open upper end 78 and moves downwardly through the collection vessel 12 and reverts along a flow path 108 into the gas recovery sleeve 92 for delivery through the gas outlet 16.

The gas-liquid separator 10 operates satisfactorily over a fairly wide range of throughput volumes. The minimum gas throughput volume is dictated by a minimum acceptable separation efficiency. It will be evident, upon reflection, that as the real volume of gas passing through the inlet structure declines, the gas velocity across the corkscrew mechanism also declines. Eventually, the velocity of the mixture passing across the mechanism 56 will decline to an extent where the gas and liquid components are insufficiently centrifugally separated to provide satisfactory separation efficiency. As heretofore practiced in the industry, when this occurs the separator is replaced with either a smaller centrifugally acting separator or with a conventional large vessel separator which reduces the gas velocity to such an extent that liquid particles of appreciable size drop out of an upwardly moving gas stream.

Rather than replace the separator 10 when the mixture velocity across the mechanism 56 declines or whenever it is desirable to reduce the operating capacity of the separator 10, a flow preventing means 110 is incorporated in the inlet structure 14 to prevent substantial flow through at least one but less than all of the flow paths 66, 68, 70.

FIGS. 3–5 illustrate the inlet end of the inlet structure 14 in various flow capacities of the separator 10. In the full capacity configuration of FIG. 3, the cross-sectional area of the conduit 48 is obstructed only by the terminal ends 112, 114, 116 of the blades 58, 60, 62, the annular end 118 of the support conduit 64 and a plate 120 closing the open end of the tubular support 64. The plate 120 is welded or otherwise sealably secured to the upper end of the support 64 and provides an opening therethrough which is closed by the head of a bolt 122.

When it is desired to reduce the operating capacity of the separator 10, the flanges 24, 26 are unbolted and the flange 24 moved to provide access to the inlet end of the inlet structure 14. The bolt 122 is unscrewed from a nut 124 welded to the bottom of the plate 120, a blocking member 126 is positioned over the opening to one of the flow paths 66, 68, 70 and the bolt 122 and washer 128 are reinstalled. As shown best by a comparison of FIGS. 2 and 4, the circular shoulder 50, the ends 112, 114, 116 of the blades 58, 60, 62 and the upper surface of the plate 120 reside in a common plane. Accordingly, the blocking member 126 may comprise a flat metal plate having a generally pie shaped segment 130 spanning the adjacent blade ends 112, 114 and a partially circular segment 132 covering the plate 120 and providing an opening for receiving the bolt 122.

With the blocking member 126 in position, it will be seen that the operating capacity of the separator 10 has been reduced by one-third since flow through the path 68 has been substantially prevented. Accordingly, the velocity through the remaining flow paths 66, 70 is considerably higher thereby allowing the separator 10 to operate at high separation efficiency.

In the event that it is desired to reduce the minimum operating capacity of the separator 10 to a greater extent, a differently shaped blocking member 134 may be utilized. The blocking member 134 includes a section 136 of sufficient circular extent to span between the blade ends 112, 114, 116 thereby closing the flow paths 68, 70 and leaving open only the flow path 66. Accordingly, the minimum operating capacity of the separator 10 has been reduced by two-thirds.

It will be apparent that either of the blocking members 126, 134 may be installed either at the time of manufacture or after a period of use to allow the separator 10 to be utilized in a situation where the original mixture throughput volume is insufficient for high separating efficiency.

Even though there is no special provision of sealing elements or the like in the flow preventing means 110, little if any leakage occurs for at least two reasons. First, the surfaces against which the blocking members 126, 134 seal reside in a common plane. Second, the unsupported side of the blocking members 126, 134 faces opposite to the direction of flow so that the blocking members 126, 134 act much like check valves and are forced by incoming pressure against the upper ends of the blades 58, 60, 62, part of the shoulder 50, the plate 120 and the upper edge 118 of the tubular support 64.

Although the invention has been described in its preferred form with a certain degree of particularity, it is understood that the present disclosure of the preferred form has been made only by way of example and numerous changes in the details of construction and combination and arrangement of parts may be resorted to without departing from the spirit and scope of the invention as hereinafter claimed. It is intended that the patent shall cover, by suitable expression in the appended claims, whatever features of patentable novelty exist in the invention disclosed.

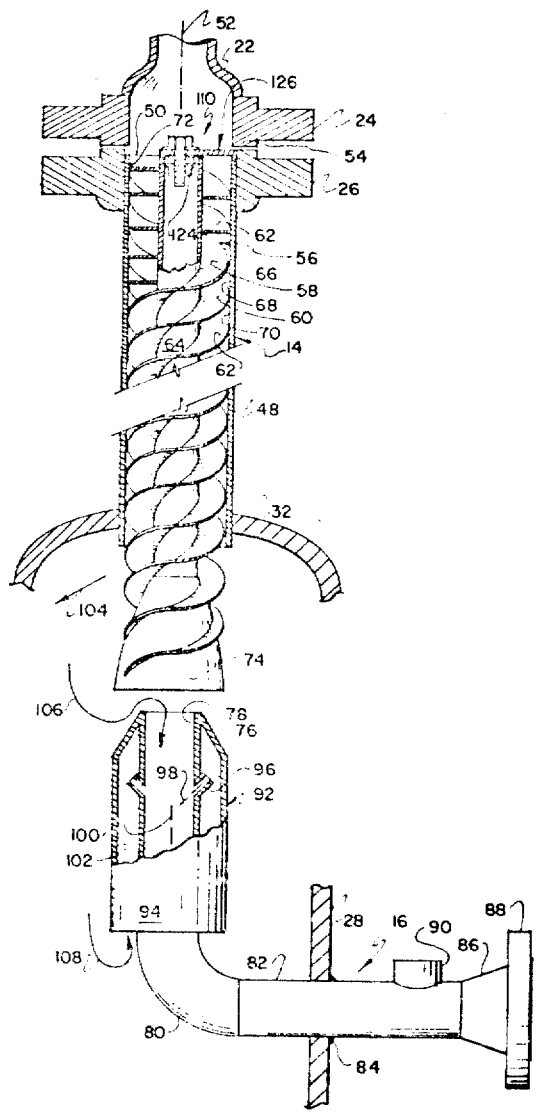

I claim:

1. A gas-liquid separator comprising:
   a collection vessel including a gas outlet and a liquid outlet;
   an inlet structure including:
      an inlet conduit opening into the vessel having an inlet end providing an inlet opening and means on the inlet end for connection to a mixture flow line for delivering mixture from the flow line to the inlet conduit; and
      a corkscrew mechanism in the inlet conduit providing a predetermined effective cross-sectional flow area for centrifugally swirling an incoming mixture;
   means for reducing the predetermined effective cross-sectional area of the corkscrew mechanism and thereby increasing the velocity of a given volumn of mixture through the corkscrew mechanism, comprising:
      a blocking member insertable through the inlet opening of the inlet conduit when the flow line is removed from the connection means; and
      means retaining the blocking member;
   the inlet opening of the inlet conduit being sufficiently large to pass the blocking member.

2. The gas-liquid contactor of claim 1 wherein the corkscrew includes a support and a plurality of corkscrew flights affixed to the support providing a plurality of separate flow paths, the blocking member being positioned in and preventing substantial flow through at least one but less than all of the flow paths.

3. The gas-liquid separator of claim 1 wherein the connection means comprises a flange surrounding the inlet conduit adjacent the inlet end thereof.

4. The gas-liquid separator of claim 3 wherein the blocking member resides within the confines of the flange.

5. The gas-liquid separator of claim 1 wherein the corkscrew mechanism includes a support providing an end adjacent the inlet end of the conduit and a plurality of corkscrew flights affixed to the support, extending along the inlet conduit and terminating in coplanar ends adjacent the inlet end of the conduit and wherein the blocking member abuts against the coplanar ends of less than all of the corkscrew flights.

6. The gas-liquid separator of claim 5 wherein the support end lies in the plane of the flight ends and the blocking member abuts against at least part of the support end.

7. The gas-liquid separator of claim 6 wherein the inlet conduit terminates in a circular shoulder lying in the plane of the flight ends and wherein the blocking member abuts at least part of the circular shoulder.

* * * * *

UNITED STATES PATENT AND TRADEMARK OFFICE
CERTIFICATE OF CORRECTION

PATENT NO. : 4,229,191
DATED : October 21, 1980
INVENTOR(S) : Lester P. Moore

It is certified that error appears in the above—identified patent and that said Letters Patent is hereby corrected as shown below:

The title page should be deleted to insert the attached title page therefor.

Signed and Sealed this

Twenty-fourth Day of February 1981

[SEAL]

Attest:

RENE D. TEGTMEYER

Attesting Officer

Acting Commissioner of Patents and Trademarks

United States Patent [19]

Moore

[11] 4,229,19:
[45] Oct. 21, 198(

[54] TECHNIQUE FOR MODIFYING THE CAPACITY OF GAS-LIQUID SEPARATOR

[76] Inventor: Lester P. Moore, 233 Hereford, Corpus Christi, Tex. 78408

[21] Appl. No.: 931,275

[22] Filed: Aug. 4, 1978

[51] Int. Cl.$^2$ .......................................... B01D 53/24
[52] U.S. Cl. ..................................... 55/203; 55/418; 55/457
[58] Field of Search ..................... 55/52, 92, 201-204, 55/207, 238, 399, 418, 456, 457

[56] References Cited

U.S. PATENT DOCUMENTS

| 680,717 | 8/1901 | Labadie | 55/457 X |
| 3,538,684 | 11/1970 | Esterhoy, Jr. et al. | 55/457 X |
| 3,597,901 | 8/1971 | Heeney | 55/457 |

FOREIGN PATENT DOCUMENTS 793989  4/1958  United Kingdom ..................... 55/45

Primary Examiner—Robert H. Spitzer
Attorney, Agent, or Firm—G. Turner Moller

[57] ABSTRACT

There is disclosed a gas-liquid separator of the typ imparting a swirl to the incoming gas-liquid mixture i order to centrifugally throw liquid droplets out of . main gas flow path. The swirling mechanism comprise a helical screw. The capacity of the separator is selec tively reduced by blocking off one or more of the sepa rate and distinct flow paths provided between th flights of the helical screw.

7 Claims, 5 Drawing Figures